W. R. JEAVONS & A. R. WHITTAKER.
ASSEMBLING MACHINE.
APPLICATION FILED OCT. 1, 1915.

1,212,227.

Patented Jan. 16, 1917.
5 SHEETS—SHEET 1.

Inventors
William R. Jeavons
and
Arnold R. Whittaker
By Hull Smith, Brock &West
Attys.

W. R. JEAVONS & A. R. WHITTAKER.
ASSEMBLING MACHINE.
APPLICATION FILED OCT. 1, 1915.

1,212,227.

Patented Jan. 16, 1917.
5 SHEETS—SHEET 2.

Inventors
William R. Jeavons and
Arnold R. Whittaker,
By Hull, Smith, Brock & West
Attys.

W. R. JEAVONS & A. R. WHITTAKER.
ASSEMBLING MACHINE.
APPLICATION FILED OCT. 1, 1915.

1,212,227.

Patented Jan. 16, 1917.
5 SHEETS—SHEET 4.

UNITED STATES PATENT OFFICE.

WILLIAM R. JEAVONS AND ARNOLD R. WHITTAKER, OF CLEVELAND, OHIO.

ASSEMBLING-MACHINE.

1,212,227.  Specification of Letters Patent.  Patented Jan. 16, 1917.

Application filed October 1, 1915. Serial No. 53,509.

*To all whom it may concern:*

Be it known that we, WILLIAM R. JEAVONS and ARNOLD R. WHITTAKER, citizens of the United States, respectively, residing at Cleveland, in the county of Cuyahoga and State of Ohio, have invented a certain new and useful Improvement in Assembling-Machines, of which the following is a full, clear, and exact description, reference being had to the accompanying drawings.

This invention relates to assembling machines; the particular embodiment of the invention shown and described herein being used for assembling and connecting parts of what are known as "blue flame oil burners," of the type disclosed in our Patent No. 1,143,199, issued June 15, 1915.

While the general object of our present invention is to provide a machine that operates automatically to present one member in correct position to another member and treat the engaging portions thereof in such manner as to fix them against relative movement, a more particular object, expressed in the terms of the specific art wherein the present embodiment of our invention is employed, is to provide a machine for automatically inserting spanners into wick tubes, and properly locating the former longitudinally of the latter and in correct angular position with respect thereto, and for fastening the members together, preferably by projecting parts of the tube about the opposite sides of the periphery of the spanner.

The above mentioned patent shows the periphery of the spanner as confined between two series of projections that are formed by pressing the metal of the wick tube inward substantially in contact with the opposite sides of the spanner, and in order to prevent distortion of the tube and the consequential improper location of the spanner, the projections of the opposed series are staggered with respect to each other, so that the circumference of the wick tube, at the zone of the spanner, is unaffected. (The importance of having the spanner occupy a plane that is precisely at right angles to the longitudinal axis of the wick tube will be appreciated upon referring to the aforesaid patent.) In other words, the alternate projections of the two series are out of alinement longitudinally of the tube so that the material for one is not drawn from the other thereby to injure it or distort the space between the series, in the process of formation.

The fundamental and most important object of our present invention, therefore, is to provide mechanism for accomplishing the above in a facile, economical, and highly efficient manner. And a further object is to provide a machine incorporating the above mechanism that can be very easily attended and operated.

In the accompanying drawings which form a part hereof.

Figure 2:
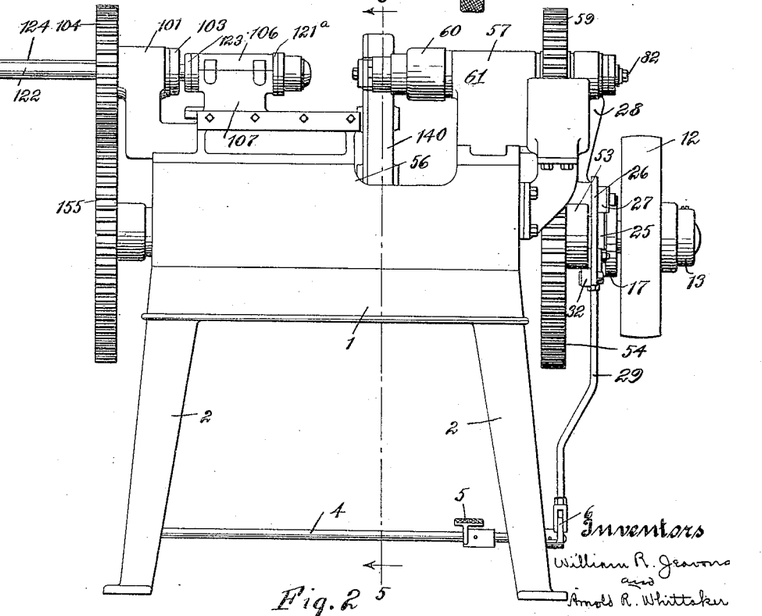
Figure 3:
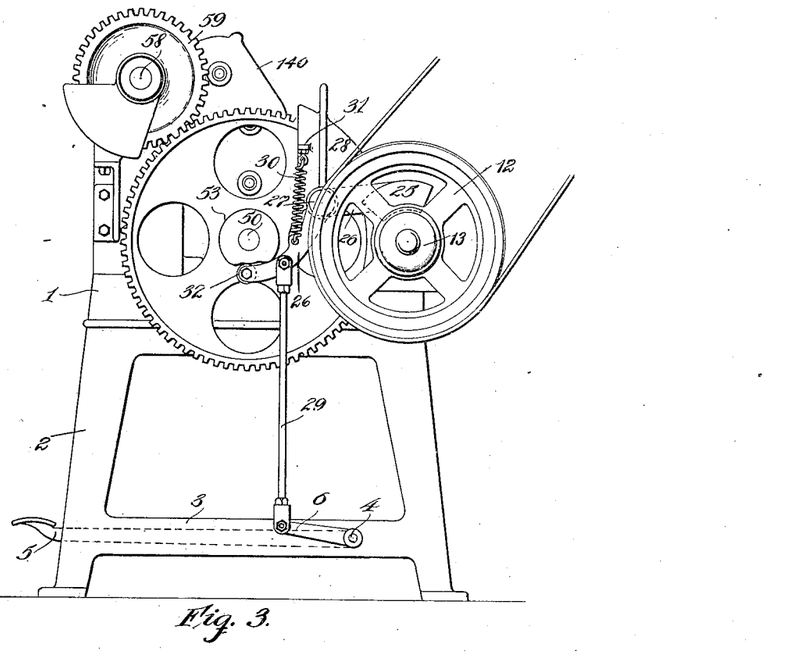
Fig. 3 is a right hand end elevation of the machine.

Describing the invention by the use of reference characters, 1 represents the machine bed that is supported upon side frames comprising legs 2, the lower portions of the respective pairs of which are connected by braces 3. A rock shaft 4 has its ends journaled within these braces near the rear of the machine, and a pedal 5 is fastened to said shaft adjacent the right hand side of the machine, and projects beyond the front thereof. An arm 6 is secured to the right hand end of the shaft 4, as shown in Figs. 2 and 3, for a purpose that will be explained presently.

Journaled within a substantial bearing 10, which rises from the rear right hand corner of the bed of the machine, is a drive shaft 11, and a pulley 12 is rotatably mounted upon the outer end of said shaft and is retained thereon by a collar 13. The hub of the pulley is provided with a plurality of bores that are substantially parallel to the working axis of the collar, and each of the bores contains a hardened pin 14, the inner end of which projects beyond the inner end surface of the hub of the pulley. The pins 14 constitute clutch elements with which the end of a plunger 15 is adapted to engage. The plunger 15 is mounted within a channel or groove that is formed in the wall of a member 16 that is secured to the shaft just inside the pulley 12. The outer end of the plunger is retained within its channel by a ring 17 that surrounds the end of the member 16, and the rear reduced end of the plunger occupies a recess in a pinion 18 that is keyed to the shaft 11 between the members 16 and the end of the bearing 10. A spring 19, contained within the aforesaid recess, tends to move the plunger 15 toward the pulley. Normally, this action is restrained by a segmental plate 25 that is secured to the rear end of an arm 26, that is journaled on a stud 27 which projects from the side of a bracket 28, that is fastened to the bed of the machine forward of the bearing 10, and which projects upward to the right and then downward, to clear a gear that is driven from the pinion 18. The portion of the arm 26, forward of its pivot point, has connection with the previously mentioned arm 6, through a rod 29, and a spring 30, which has one of its ends anchored to a lug 31 that extends from the side of the bracket 28, and its other end connected to the forward portion of the arm 26, tends to rock said arm in a direction to elevate the forward end of the arm 6, (and consequently the pedal 5 through the connections between it and said pedal) and to depress the rear end of the arm 26 and project the segmental plate 25 into the path of the plunger 15. The forward end of the arm 26 is provided with an anti-friction roller 32 for a purpose presently to be explained.

Figure 4:
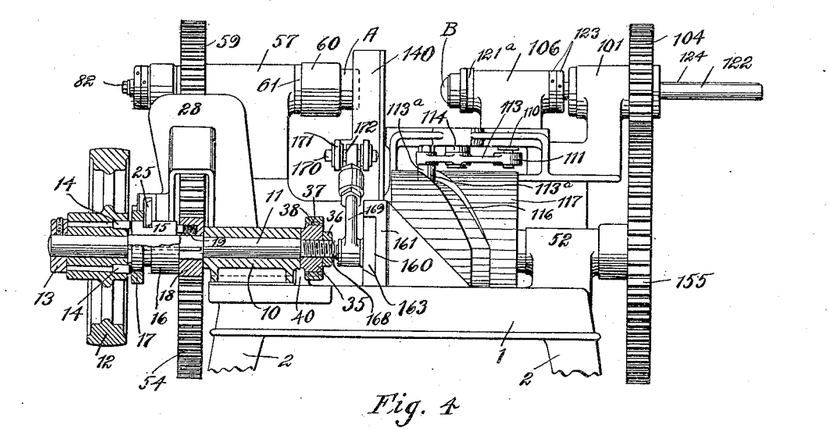
Fig. 4 is a rear elevation of the machine, certain parts being shown in section to reveal their structural details.

From the foregoing description it will be seen that upon the depression of the pedal 5, the shaft 4 will be rocked in a direction to depress the forward end of the arm 6, and through the rod 29, draw downward the forward end of the arm 26 and elevate the rear end of said arm to remove the segmental plate 25 from the notch in the upper edge of the plunger 15, allowing the spring 19 to thrust the plunger forward into the path of the pins or clutch elements 14 of the pulley 12. Assuming now that the pulley is being driven by a suitable belt, it will be seen that its rotation will be transmitted to the shaft 11 through the plunger 15, and the member 16 wherein the plunger is confined and which is keyed to the shaft, as shown in Fig. 4.

The inner end of the shaft 11, has secured to it a brake drum 35, that is retained upon the shaft by a nut 36. A split brake collar 37, having a lining 38 of suitable friction material, surrounds the drum 35, and an arm or extension 39, which projects forward from the collar 37, is fastened to a post 40, which rises from the bed of the machine, as clearly shown in Fig. 1. The separated ends of the split collar 37 may be drawn together by means of screws 41, thereby to increase the friction of the brake, or said ends may be permitted to separate by the loosening of said screw, to reduce such friction.

Figure 1:
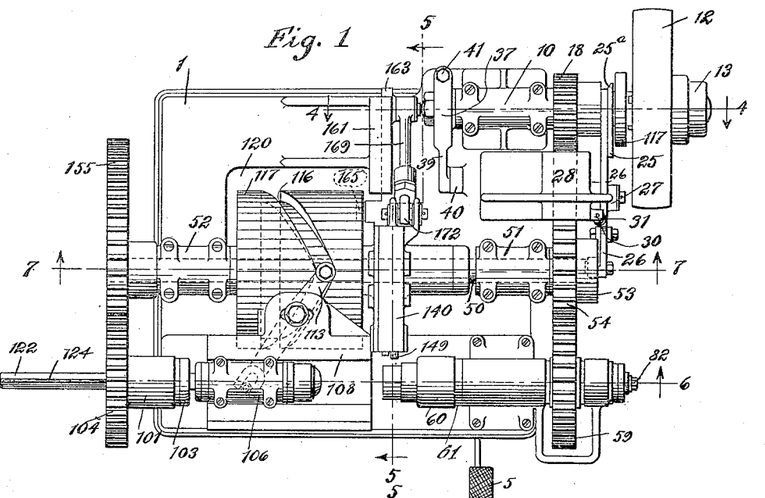
Figures 1 and 2 are a plan and front elevation, respectively, of a machine constructed in accordance with our invention.

It will be observed, especially from Fig. 1, that the rear end of the segmental plate 25 is beveled at 25$^a$. From what has already been explained, it will be understood that as soon as the pedal 5 is depressed, the shaft 11, becomes clutched to the pulley 12, and rotates with it. Now, as soon as the segmental plate is permitted to drop into the path of the abutment portion of the plunger 15, its inclined or beveled end 25$^a$ will be engaged by said abutment portion, and, acting as a cam, will withdraw the plunger from the path of the clutch elements 14.

A shaft 50 is supported above and transverse the center of the machine within bearings 51 and 52, and the extreme right hand end of the shaft has a cam 53 fastened to it for coöperation with the anti-friction roller 32, that is carried by the forward end of the arm 26. Between the cam 53 and the bearing 51, a spur gear 54 is secured to the shaft, and this gear meshes with the previously mentioned pinion 18, that is keyed to the shaft 11. Therefore, when the clutch is actuated to cause the shaft 11 to rotate, the shaft 50 will be driven therefrom through the pinion 18 and gear 54. From Fig. 3 it will be seen that the anti-friction roller 32 of the arm 26 normally occupies a depression in the cam 53. Directly after the pedal 5 is depressed and the clutch actuated, the cam 53 will be rotated a sufficient distance to bring the elevated portion of the cam into engagement with the roller 32, so that the forward end of the arm cannot be raised by the spring 30 until the shaft 50 has made practically a complete rotation and the roller has again entered the depression of the cam. Upon the swinging of the arm 26 to normal position the segmental plate 25 will descend to unclutch the shaft 11 from the pulley 12, as already explained. Thereafter, the momentum of the moving parts of the machine will be overcome by the brake above described, and the operation will immediately stop.

The front portion of the bed 1 is elevated to form a table 56 which supports, at its right hand end, a bearing 57 for a mandrel 58. A spur gear 59 is fastened to the mandrel in the plane of the gear 54, from which gear it is driven. A socket member 60 is threaded onto the opposite end of the mandrel against a collar 61 thereof, said collar acting to take the end thrust of the mandrel against the adjacent end of the bearing 57. A cylindrical recess or socket is formed in the side of the member 60 remote from the mandrel, and said socket comprises an enlarged portion which extends some distance in from the face of the member, and is then reduced in diameter, thereby to form a shoulder 62 transverse the axis of the socket. An annular channel 63 is formed in the shoulder 62, and contains a ring 64 that is normally held forward with its front face flush with the shoulder 62, by a suitable number of springs 65 which occupy recesses 66 in the opposed wall of the channel 63.

One end of a sleeve 68 occupies the enlarged portion of the aforesaid socket, and is held therein by any suitable means, as by a screw 69 that passes through the wall of the socket and into the sleeve. A shell 70, somewhat longer than the sleeve 68, reposes within the sleeve, with its rear end against the shoulder 62, and the outer wall of the shell is spaced from the inner wall of the sleeve a distance substantially equal to the thickness of the material from which the previously mentioned wick tubes are made. It will be noted that the inner wall of the sleeve is flared outwardly at its open or left hand end to facilitate the insertion of a wick tube.

Figure 12:
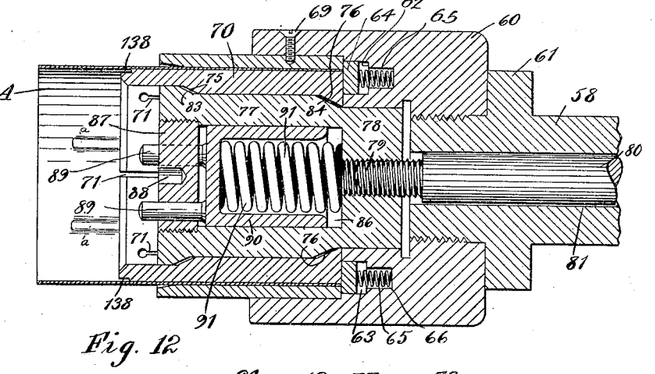
Fig. 12 is a section through the wick tube carrier, with a wick tube therein.

The shell 70 is split from one end almost to the other at various points therearound for the purpose of rendering it yielding circumferentially. (See Fig. 12.) The inside wall of the shell 70 is divided into two portions of different diameters that are connected by an inclined or tapered portion 75, the larger cylindrical portion being located at the right hand end of the shell. The opposite end of the smaller cylindrical portion converges at an angle substantially equal to the angle of the portion 75, as shown at 76. The shell 70 is held in place with its rear end against the shoulder 62, by a retaining head 77, having an extension 78 that fits into the reduced end of the recess of the socket member 60. The extension is provided with a threaded bore for the reception of the threaded end 79 of a rod 80 that extends through a bore 81 of the mandrel 58, said rod having a head 82 beyond the opposite end of the mandrel by means of which the rod may be turned to draw the head into the shell 70. The body portion of the retaining head is made up of portions of different diameters, which diameters correspond substantially to the normal diameters of the different portions of the shell. An inclined portion 83 connects the larger and smaller portions of the retaining head, and a similar portion 84, is located between the smaller portion of the head and the extension 78 thereof. The inclination of these portions is substantially the same as that of the inclined portion of the shell. From the foregoing it will be seen that when the rod 80 is turned by means of its head 82, in a direction corresponding to the inclination of the thread 79, the retaining head will be drawn into the shell 70 and, through the coöperation of the inclined portion of the head and shell, the latter may be expanded for the purpose of accomplishing a slight and accurate circumferential adjustment of the shell.

The retaining head 77 is provided with a central cylindrical cavity 86, the outer or open end of which is internally threaded for the reception of a plug 87. This plug has a central recess 88 that opens outward from the head, and a series of apertures which are spaced radially from the recess within which are guided pins 89.. The inner ends of these pins bear against the end of a cylindrical cup-shaped plunger 90 that is reciprocable within the cavity 86, and that is normally maintained forward in a position to eject the pins 89, by a spring 91 that is confined between the inner circular wall of the plunger, and the opposed wall of the cavity 86.

In Figs. 8 to 13 the wick tube is designated A, and the spanner B. For purposes set forth in our patent already referred to, the wick tube is provided with a pair of spaced longitudinal ribs *a* which extends from near one end of the tube to within a short distance of its opposite end. The sleeve 68 is provided with a pair of channels for the reception of the ribs *a*, as indicated at 95, in Fig. 14. The spanner B has a perforated inwardly projecting lug *b* that serves as a guide for a lifter that is used for tilting the flame spreader when the burner is complete, and it is important that the projection *b* be located a fixed distance from the ribs *a*. To insure this proper angular relation between the spanner and wick tube, the former is provided with a lug *b'* that is adapted to occupy one of the channels formed by the aforesaid ribs *a*, when the spanner is in place, the lug being resilient enough to spring into the channel after passing through the end of the tube.

Figure 5:
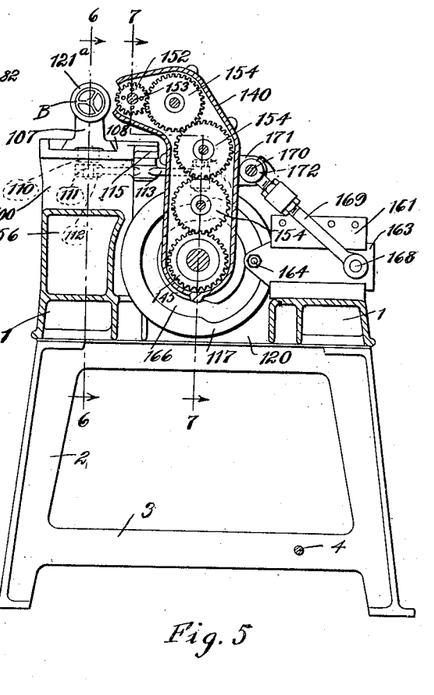
Fig. 5 is a vertical section through the machine in a plane parallel to Fig. 3, the section being taken substantially on the line 5—5 of Figs. 1 and 2.
Figure 7:
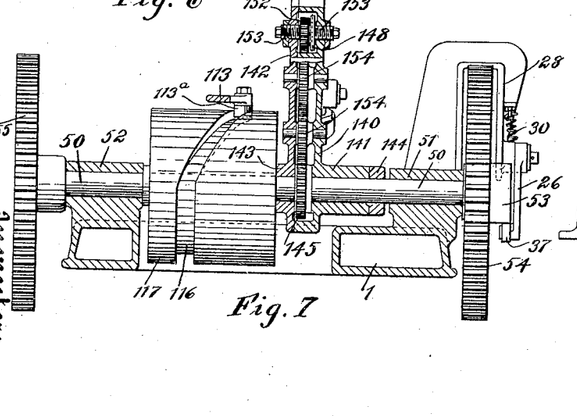
Fig. 7 is a substantially central longitudinal section through the machine on lines 7—7 of Figs. 1 and 5, the offset in the plane of section being indicated by the section line of Fig. 5.
Figure 8:
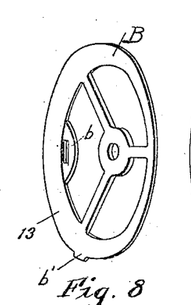
Figs. 8 and 9 are perspective views, respectively, of a spanner and wick tube of the type shown and claimed in our patent aforesaid, and assembled and connected by the machine illustrated in the foregoing figures.
Figure 9:
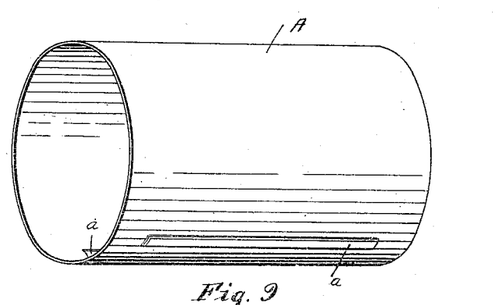
Figure 10:
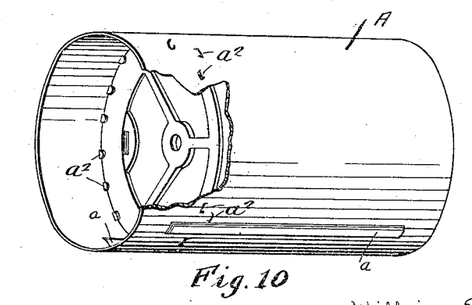
Fig. 10 is a similar view of the assembled spanner and wick tube.
Figure 11:
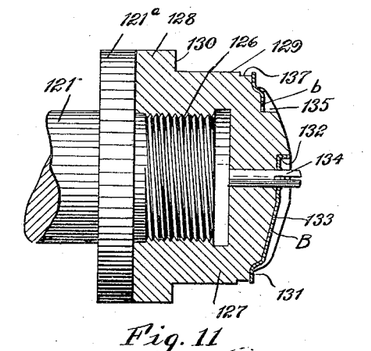
Fig. 11 is a sectional detail of the spanner carrying head, with a spanner applied thereto.

A housing 100 is supported upon the left hand end of the table 56, and a bearing 101 rises from the left hand end thereof, such bearing being in axial alinement with the previously mentioned bearing 57. A sleeve 102 is journaled within the bearing 101, and has a collar 103 that engages the inner end of the bearing. A gear 104, which is the same in diameter, etc., as the gear 59, is secured to the opposite end of the sleeve. Thus it will be seen that the thrust of the sleeve is taken by the collar 103 in one direction, and by the hub of the gear 104 in the other direction. A head 105, comprising a bearing 106 that is rigidly supported by and above a base 107, is reciprocable along the top of the housing 101, the sides of the base being flared downward and outward for coöperation with the upwardly converging faces of the opposed rails 108, that are secured to the housing and extend along the upper front and rear edges thereof. This construction constitutes a dovetailed connection between the head 105 and the housing 100. The top wall of the housing is provided with a slot 109 through which a boss 110 depends from the base 107 of the aforesaid head. The boss carries a pin 111 that is received by a fork 112 on the end of a lever 113. This lever is pivoted upon a stud 114 that is carried by a rearward extension 115 (Fig. 5) of the housing 100. The lever 113 extends rearward from its pivotal point to about the center of the machine, where it is provided with an antifriction roller 113$^a$. This roller occupies a cam groove 116 that is formed in the wall of a drum 117, secured to the shaft 50, adjacent the bearing 52. The bed 1 of the machine is provided with an opening 120 for the accommodation of the drum 117. It is clear from Figs. 1, 4 and 7, that the cam groove 116 has what will be termed a straight portion which extends substantially half way around the drum and is in a plane at right angles to the rotating axis of the drum. From each end of the straight portion, the cam groove is inclined gradually toward the opposite end of the drum until half way between the ends of the straight portion it reaches its maximum departure therefrom. This point of the cam groove will be termed the normal station thereof.

Figure 6:
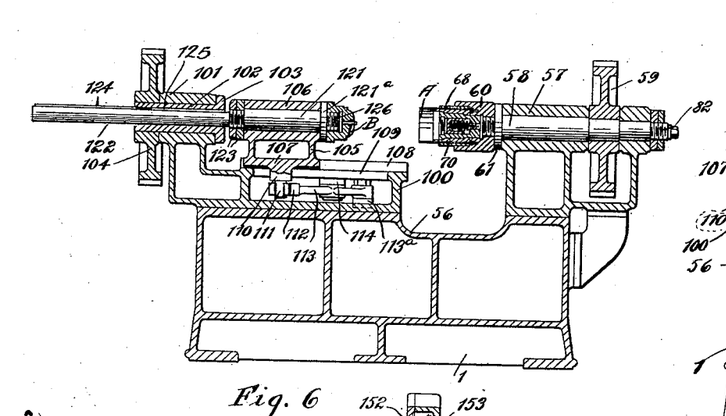
Fig. 6 is a longitudinal section through the machine, in the central vertical plane of the work supporting members, the plane of section being indicated by the line 6—6 of Figs. 1 and 5.

Returning now to the head 105, and referring particularly to Fig. 6, 121 is a shaft that is journaled within the bearing 106 of the head 105, said shaft having a collar 121$^a$ at one end, and threaded at the other for the reception of nuts 123, which act, with the aforesaid collar 121$^a$, to retain the shaft within the bearing. Beyond the nuts 123, the shaft is reduced in diameter to form a spindle 122 that is slidable through the sleeve 102, and the sleeve is equipped with a keyway 124 that is traversed by a key 125 (Fig. 6), whereby the shaft is caused to rotate with the sleeve, but is slidable therethrough when the head 105 is reciprocated.

Beyond the collar 121$^a$, the shaft is provided with a threaded extension 126. The spanner carrying head 127 is provided with a threaded socket for the reception of the extension 126, and this head, as will be clearly seen from Figs. 11 and 13, has a portion which is of substantially the same diameter as the collar 121$^a$, such portion being located adjacent said collar, the head having also a portion 129 that is of the same diameter as the shell 70. Between the portions 128 and 129 there is a transverse shoulder 130 for a purpose which will be presently described. The front or right hand end of the spanner carrying head is formed to receive a spanner B, the face of the head being bulged outward from the plane of a ledge 131 against which the rim of the spanner is adapted to rest, a distance substantially equal to the full depth of the spanner. The face of the head 127 is provided with a central recess 132, and radial grooves 133 for the accommodation of the hub portion and spokes, respectively, of the spanner. Also, the head is provided with a centering pin 134 which is received by the central aperture of the spanner, said pin having its outer end split so as to yield slightly when the spanner is applied thereto, and so that it will also enter, with slight friction, the recess 88 of the plug 87 of the wick tube carrier. The spanner carrying head is further provided with a notch into which the perforated projection $b$ reposes when the spanner is placed thereon.

Figure 13:
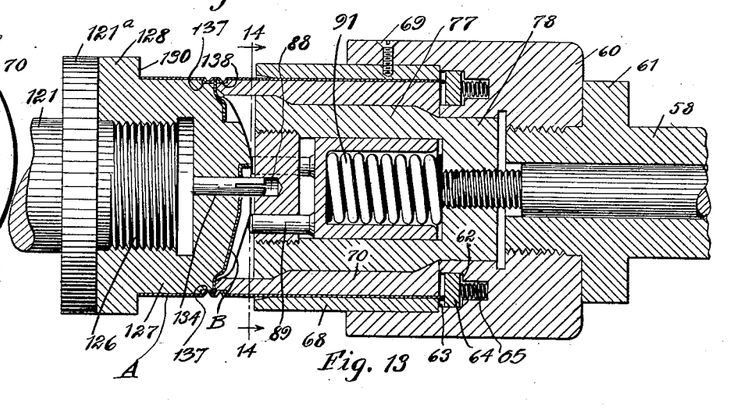
Fig. 13 illustrates the parts of Figs. 11 and 12 in coöperation, and shows projections of the wick tube pressed about the opposite sides of the periphery of the spanner.
Figure 14:
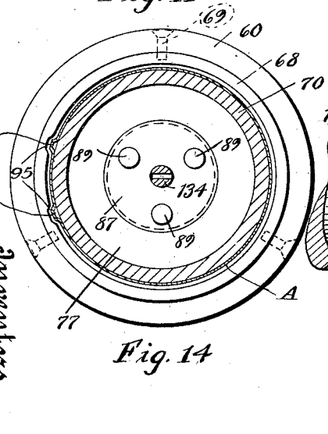
Fig. 14 is a transverse sectional view on line 14—14 of Fig. 13.

From what has been thus far described it will be seen that, when the drum 117 is rotated, the roller 113$^a$ will ride along one of the inclined portions of the groove 116 until it reaches the straight portion of the groove, which will result in swinging the lever 113 a sufficient distance to move the head 105, and consequently the spanner carrying head 127 into coöperation with the wick tube carrier, as illustrated in Fig. 13. Under such conditions, the rim of the spanner is clamped between the ledge 131 of the spanner carrying head and the forward end of the shell 70; the centering pin 134 will occupy the recess 88 of the plug 87; and the pin 89 will have been engaged by the spokes of the spanner and pressed inward against the tension of the spring 91. As the spanner carrying head approaches its final position within the wick tube, the shoulder 130 of the head engages the adjacent end of the tube and removes the tube bodily against the action of the spring pressed ring 64. This insures the proper spacing of the spanner from the near or upper end of the wick tube, so that the flame spreader associated with it in the complete burner is assured of being properly located with respect to the other parts of the burner. To those familiar with the art, it is well known that a very slight discrepancy in the proper positioning of the flame spreader will result in very unsatisfactory results. It is not material, however, that the opposite or lower end of the wick tube be located an accurate distance from the spanner.

Attention is called to the fact that the adjacent, peripheral portions of the spanner carrying head and the shell 70 are rabbeted at 137 and 138, respectively. It will be noted also, that the diameter of the spanner is equal to that of the aforesaid head and sleeve. We will now describe the mechanism for pressing portions of the wick tube into the rabbeted portions 137 and 138 about opposite sides of the periphery of the spanner, thereby to securely hold the spanner in place. It has already been explained that there are two series of projections, designated $a^2$ in the drawings, one being located on each side of the spanner, and that the projections of one series are staggered with respect to those of the other so as to prevent the metal between the projections from being drawn inward and exerting too much pressure upon the edge of the spanner, thereby tending to distort it. Before further considering the mechanism for projecting portions of the wick tube about the periphery of the spanner, it should be borne in mind that such mechanism must operate in absolute harmony with the movements of the tube and spanner carriers in order to prevent injury to the ribs $a$ of the wick tube.

Figure 15:
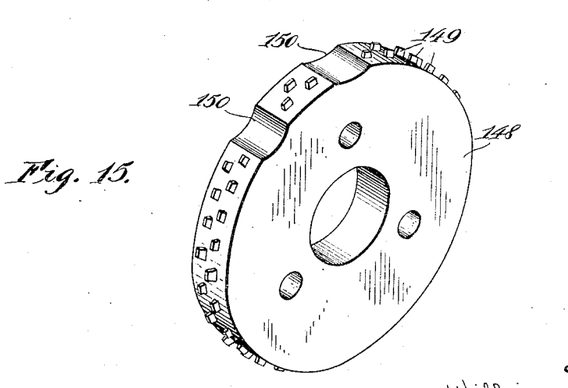
Fig. 15 is a perspective view of the rotary die for projecting parts of the wick tube about the edge of the spanner.

A casing 140, having a hub 141 that is journaled upon the shaft 50, extends upward and forward from the shaft, the forward end of the casing being open and reposing in juxtaposition to the end of the shell 70. A side plate 142 is applied to one side of the casing and has a hub section 143 that is also journaled upon the shaft 50, the composite hub, comprising the sections 141 and 143, being confined between the end of the drum 117 and a collar 144 that is secured to the shaft adjacent the bearing 51. A spur gear 145 is secured to the shaft 50 inside the casing 140. In Fig. 15 there is shown an enlarged perspective view of the device or rotary die for embossing the projections upon the wick tube. This die 148 consists of a disk having two series of peripheral projections 149, the edge of the disk being notched at 150 for the purpose of escaping the ridges $a$ of the wick tube. This die 148, together with the pinion 152 to which it is secured, is journaled upon bearings 153 that are threaded through the sides of the casing 140 adjacent the forward open end thereof, so that the periphery of the die 148 extends beyond the end of the casing. Power is transmitted from the shaft 50 through the aforesaid gear 145 and idlers 154, to the pinion 152, the idlers being supported upon stub shafts that are supported in the sides of the casing. It will be observed that the diameters of the gear 145 and idlers 154 are the same; and it will be explained that the ratio of the pinion 152 to the idler wherewith it meshes, is the same as the ratio between the gear 104, that is indirectly splined to the spindle 123 through the sleeve 102, and the gear 155 whereby it is driven. From Figs. 1 and 2 it will be seen that the gear 155 is secured to the end of the shaft 50 remote from the gear 54 that drives the gear 59; and it will be further explained that the gears 54 and 59 are, respectively, the same in diameter as the gears 155 and 104.

It will be seen from the foregoing that the rotary die 148 is driven at the same peripheral speed as the wick tube and spanner; and it will be remembered that the wick tube and spanner bear a fixed angular relation to their supporting elements, wherefore the notches 150 of the rotary die are compelled to "track" with the ribs $a$ of the wick tube.

It has been said that the casing 140 is journaled upon the shaft 50, and, in the position shown in the drawings, the rotary die is spaced some distance from the wick tube. The mechanism for rocking the casing 140 to and from the wick tube will now be described. Within a guideway 160 of a vertical plate 161 that rises from the rear side of the bed of the machine and extends fore and aft thereof, is a slide 163, to the forward end of which is secured, by means of a bolt 164, an antifriction roller 165, that occupies a cam groove 166 in the end of the drum 117. It will be seen from Fig. 5, that the groove 166 has what will be termed the inner section that extends through fully 180° of the drum, while the remainder of the groove is made up of what will be termed the outer section, and the inclined portions which constitute the approach from one section to the other. When the machine is at rest, the roller 165 occupies the center of the outer section of the groove, and it will be remembered that under the same circumstances, the roller which traverses the groove in the periphery of the drum occupies the normal station thereof. It will also be remembered that each of the inclined portions of the cam groove 116 occupies substantially 90° of the circumference of the drum, or the same angle as that occupied by that portion of the outer section of the groove 166 that has to be traveled before the roller 165 enters the inner section of the groove. Therefore, just as soon as the roller 113$^a$ has traversed its groove a sufficient distance to present the spanner in proper relation to the wick tube through the intervention of the lever 113 and head 105, the roller 165 will have just reached the entrance end of the inner section of the cam groove 166. The slide 163 is provided with a wrist pin 168 upon which is journaled one end of an adjustable pitman 169, the opposite end of which is pivotally connected to the casing 140 a substantial distance above the shaft 50. The pivotal connection between the pitman 169 and the casing is accomplished by means of a pin 170, that is supported by spaced ears 171 that extend rearward from the casing and between which is located the eye 172 of the pitman through which the pin 170 passes.

From what has been said as to the relative shape and arrangement of the cam grooves 116 and 166, it will be seen that the slide 163 is drawn forward to rock the casing 140, through the pitman 169, forward into coactive relation with the wick tube and spanner carriers during the time that said carriers are maintained in coactive relation to each other.

It is obvious that the metal of the tube, when engaged by the projections of the rotary die, will be pressed into the rabbeted portions of the spanner carrying head and the shell 70, the edge of the spanner and the adjacent edges of the rabbeted portions constituting in effect, the matrix of the die.

From the foregoing detailed description of the construction of the machine, and the explanatory remarks as to the operations of the various submechanisms thereof, the use of the machine is obvious. However, it may be explained briefly that the operator stands at the front of the machine and places a spanner upon the spanner carrying head, and a wick tube upon the shell 70. He now depresses the pedal 5 to rock the lever 26, thereby releasing the slide 15 and allowing it to engage one of the pins or clutch elements 14 that is carried by the continually driven pulley 12. Thereupon, the shaft 50 is started to rotate, the cam 53 now serving to retain the clutch in operative condition and the pedal 5 depressed until a complete operation of the machine is accomplished. Through the cam grooves of the drum 117 and the mechanisms that are operated thereby, the spanner is inserted into the end of the wick tube, and the rotary die is presented to the periphery of the latter to interlock the engaging portions of the members. After a complete rotation of the rotary die and wick tubes, the parts are returned to normal position, when the operator may remove the wick tube from the shell 70. To facilitate the removal of the wick tube from the shell, the pins 89 are ejected by means of the plunger 90, through the action of the spring 91, and when it is remembered that the pins 89 engage the radial arms or spokes of the spanner, it will be seen that such an action will result in moving the entire wick tube along the shell to withdraw the projections beyond the rabbeted portion 138 of the shell, into which they are compressed to a comparatively snug fit, through the action of the rotary die.

Having thus described our invention, what we claim is:—

1. In apparatus for uniting wick tubes and spanners, the combination of means for supporting the wick tube and spanner in correct relation to each other, said means having opposed portions between which the rim of the spanner is confined, and having recesses on either side of the periphery of the spanner, a die member having two substantially parallel series of projections, the projections of one series being staggered with respect to those of the other, and mechanism for guiding the die member into contact with the circumference of the tube so that the projections thereof are caused to depress portions of the tube about the opposite sides of the periphery of the spanner into the aforesaid recesses of the supporting means.

2. In apparatus for uniting wick tubes and spanners, the combination of means for supporting the wick tube and spanner in correct relation to each other, and a member having two substantially parallel series of projections, said member being movable into contact with the circumference of the tube so that the projections thereof are caused to depress portions of the tube about the opposite sides of the periphery of the spanner, and ejecting mechanism for initiating the removal of the tube and spanner from the supporting means.

3. In apparatus for uniting wick tubes and spanners, the combination of means for supporting the wick tube and spanner in correct relation to each other, said means having opposed portions between which the rim of the spanner is confined, and having recesses on either side of the periphery thereof, a die member having two substantially parallel series of projections, the projections of one series being staggered with respect to those of the other, mechanism for guiding the die member into contact with the circumference of the tube so that the projections thereof are caused to depress portions of the tube about the opposite sides of the periphery of the spanner into the aforesaid recesses of the supporting means, and ejecting mechanism for initiating the removal of the tube and spanner from the supporting means.

4. In apparatus for uniting wick tubes and spanners, the combination of means for supporting the wick tube and spanner in correct relation to each other, said means being revoluble upon the longitudinal axis of the tube, a rotary die member having two series of peripheral projections, means for presenting the die member to the wick tube so that a series of its projections coöperate therewith on each side of the periphery of the spanner thereby to project portions of the wick tube about opposite sides of the spanner, and mechanism for rotating said supporting means and the rotary die member at the same peripheral speed.

5. In apparatus for uniting wick tubes and spanners, the combination of means for supporting the wick tube and spanner in correct relation to each other, said means being revoluble upon the longitudinal axis of the tube and having opposed portions between which the rim of the spanner is confined, said means also being provided with recesses adjacent the opposite sides of the periphery of the spanner, a rotary die member having two series of peripheral projections, the projections of one series being staggered with respect to those of the other, means for presenting the die member to the wick tube so that a series of its projections coöperate therewith on each side of the periphery of the spanner thereby to project portions of the wick tube into the aforesaid recesses of the supporting means, and mechanism for rotating said supporting means and the rotary die member at the same peripheral speed.

6. In apparatus for uniting wick tubes and spanners, the combination of means for supporting the wick tube and spanner in correct relation to each other, said means being revoluble upon the longitudinal axis of the tube, a rotary die member having two series of peripheral projections, means for presenting the die member to the wick tube so that a series of its projections coöperate therewith on each side of the periphery of the spanner thereby to project portions of the wick tube about opposite sides of the spanner, mechanism for rotating said supporting means and the rotary die member at the same peripheral speed, and ejecting mechanism for initiating the removal of the assembled wick tube and spanner from the supporting means.

7. In apparatus for uniting tubes and spanners, the combination of means for supporting the wick tube and spanner in correct relation to each other, said means being revoluble upon the longitudinal axis of the tube and having opposed portions between which the rim of the spanner is confined, said means also being provided with recesses adjacent the opposite sides of the periphery of the spanner, a rotary die member having two series of peripheral projections, the projections of one series being staggered with respect to those of the other, means for presenting the die member to the wick tube so that a series of its projections coöperate therewith on each side of the periphery of the spanner thereby to project portions of the wick tube into the aforesaid recesses of the supporting means, mechanism for rotating said supporting means and the rotary die member at the same peripheral speed, and ejecting mechanism for initiating the removal of the assembled wick tube and spanner from the supporting means.

8. In apparatus for uniting wick tubes and spanners, the combination of a supporting member for the wick tube, said member having a yielding abutment against which one end of the tube is adapted to bear, a spanner carrying member that is movable into operative relation to the former member thereby to insert the spanner into the end of the wick tube, said members having opposed portions between which the rim of the spanner is arranged to be clamped and having, also, circumferential recesses on opposite sides of the periphery of the spanner, the spanner carrying member having a fixed abutment for engagement with the adjacent end of the wick tube thereby to force it against the action of the aforesaid yielding abutment to correctly locate the spanner within the tube, a die member having two series of projections that are spaced apart, the projections of one series being staggered with respect to those of the other, and mechanism for moving the die member into operative relation to the wick tube and for actuating the same thereby to project portions of the wick tube about the opposite sides of the spanner and into the aforesaid recesses of the supporting member.

9. In apparatus for uniting wick tubes and spanners, the combination of a tube supporting member having a yielding abutment wherewith one end of the tube engages, a spanner carrying member that is movable into operative relation to the wick tube supporting member and having a shoulder for engagement with the opposite end of the tube, said members having opposed portions between which the rim of the spanner is clamped, said members also having recesses on opposite sides of the periphery of the spanner, and a die member that is arranged to be moved into contact with the circumference of the tube in the zone of the spanner, said die member having two series of projections that are adapted to press portions of the tube about opposite sides of the spanner, the projections of one series being staggered with respect to those of the other.

10. In apparatus for uniting wick tubes and spanners, the combination of a tube supporting device comprising a sleeve, a member for supporting the sleeve, an expansible shell within the sleeve and supported with its outer wall spaced from the inner wall of the sleeve, a retaining head within the shell that is movable longitudinally thereof, the shell and the head having coöperating inclined portions whereby the shell may be expanded or retracted by a longitudinal adjustment of the head, means for so adjusting the head, a yielding abutment supported by the first mentioned member adjacent the ends of the sleeve and shell for one end of the tube, a spanner supporting member that is movable into operative relation to the tube supporting device, said spanner supporting member having a shoulder against which the opposite end of the tube engages and whereby it is moved against the action of the aforesaid yielding abutment, the spanner carrying member having a portion that is opposed to the end of the aforesaid shell and between which and the end of the shell the rim of the spanner is clamped, and means for connecting the adjacent portions of the tube and spanner.

11. In apparatus for uniting wick tubes and spanners, the combination of a tube supporting device comprising a sleeve, a member for supporting the sleeve, an expansible shell within the sleeve and supported with its outer wall spaced from the inner wall of the sleeeve a distance substantially equal to the thickness of the material of the tube, a retaining head within the shell that is movable longitudinally thereof, the shell and the head having coöperating inclined portions whereby the shell may be expanded or retracted by a longitudinal adjustment of the head, means for so adjusting the head, an abutment supported by the first mentioned member adjacent the ends of the sleeve and shell for engagement by one end of the tube, means for yieldingly retaining the abutment member in normal position, a spanner supporting member that is movable into operative relation to the tube supporting device, said spanner supporting member having a shoulder against which the opposite end of the tube engages thereby to move the tube against the action of the aforesaid yielding abutment, the spanner carrying member having a portion between which and the opposed end of the shell the rim of the spanner is clamped, the adjacent end of the spanner carrying member and the shell being rabbeted about their peripheries on opposite sides of the spanner, a die member for engagement with the circumference of the wick tube in the zone of the spanner, said die member having two series of projections that are adapted to press portions of the tube into the aforesaid rabbeted portions and about the edge of the spanner, the projections of one series being staggered with respect to those of the other.

12. In apparatus for uniting wick tubes and spanners, the combination of a tube supporting device comprising a sleeve, a member for supporting the sleeve, a shell within the sleeve and supported with its outer wall spaced from the inner wall of the sleeve a distance substantially equal to the thickness of the material of the tube, a retaining head within the shell, a yielding abutment supported by the first mentioned member adjacent the ends of the sleeve and shell for engagement by one end of the tube, a spanner supporting member that is movable into operative relation to the tube supporting device, said spanner supporting member having a shoulder against which the opposite end of the tube engages and whereby it is moved against the action of the aforesaid yielding abutment, the spanner carrying member having a portion between which and the opposed end of the shell the rim of the spanner is clamped, means for connecting the adjacent portions of the wick tube and spanner, the retaining head having a longitudinal bore, a plunger therein, a spring within the bore and confined between opposed walls of said bore and plunger, and ejecting pins engaged by the plunger and arranged to be projected against the spanner, thereby to initiate the removal of the assembled spanner and wick tube from the tube supporting device.

13. In apparatus for uniting wick tubes and spanners, the combination of a tube supporting device, a spanner carrying member that is movable into operative relation to the tube supporting device, thereby to insert the spanner into the tube, means for fixing against relative movement the adjacent portions of the tube and spanner, the tube supporting device having a longitudinal bore, a spring within the bore, and an ejecting pin guided longitudinally of the bore and actuated by the spring, said pin being arranged to engage the spanner thereby to initiate the removal of the assembled spanner and wick tube from the tube supporting device.

14. In apparatus for uniting wick tubes and spanners, the former having a longitudinal rib, the combination of a tube supporting member having a portion for coöperation with the aforesaid rib, thereby to properly position the tube on its supporting member, a spanner carrying member, said members being relatively movable into operative association with each other and having opposed portions between which the rim of the spanner is confined, said members being rotatable upon a common axis, a rotary die member having two series of peripheral projections that are adapted to engage the tube in the zone of the spanner thereby to press portions of the tube about opposite sides of the spanner, and mechanism for rotating the spanner and tube supporting members and die member at the same peripheral speed and in a fixed angular relation to each other, the projections of the die member being arranged to escape the rib of the wick tube.

15. In apparatus for uniting wick tubes and spanners, the former having a longitudinal rib, the combination of a tube supporting member having a portion for coöperation with the aforesaid rib, thereby to properly position the tube on its supporting member, a spanner carrying member, said members being relatively movable into operative association with each other and having opposed portions between which the rim of the spanner is confined having also abutments wherewith the opposite ends of the tube engage, said members being rotatable upon a common axis, a rotary die member having two series of projections that are adapted to engage the tube in the zone of the spanner thereby to press portions of the tube about opposite sides of the spanner, and mechanism for rotating the die member and the spanner and tube supporting members at the same peripheral speed and in a fixed angular relation to each other, the projections of the die member being arranged to escape the rib of the wick tube.

16. In a machine of the character set forth, the combination of a shaft, a driving member loosely mounted thereon, a clutch for operatively connecting the driving member and the shaft, a clutch actuating device, a second shaft, transmission gearing between the aforesaid shafts, a rotary support for each of two elements that are to be united, one of said supports being movable toward and from the other thereby to present one of said elements in correct relation to the other, transmission gearing between the second shaft and the rotary supporting elements, a cam upon the second shaft, a lever pivoted upon a stationary support and having one of its ends arranged to be moved by the aforesaid cam and its opposite end operatively connected to the movable support, a rotary connecting member adapted to be moved into contact with one of the aforesaid elements to unite it to the other, means for supporting said member from the second shaft and to maintain it at a fixed radius therefrom, operative connections between said means and the second shaft for rocking said member to effective position when the aforesaid elements have been moved into correct relation to each other, transmission gearing between the second shaft and the connecting member whereby the same is rotated at the same peripheral speed as the rotary supports, and a second cam on the second shaft for coöperation with the clutch actuating device thereby to maintain the clutch effective until the second shaft has rotated sufficiently to complete the uniting operation.

17. In a machine of the character set forth, the combination of a shaft, a driving member loosely mounted thereon, a clutch for operatively connecting the driving member and the shaft, a clutch actuating device, a second shaft, transmission gearing between the aforesaid shafts, a rotary support for each of two elements that are to be united, one of said supports being movable toward and from the other thereby to present one of said elements in correct relation to the other, transmission gearing between the second shaft and the rotary supporting elements, a cam upon the second shaft, a lever pivoted upon a stationary support and having one of its ends arranged to be moved by the aforesaid cam and its opposite end operatively connected to the movable support, a connecting member adapted to be moved into contact with one of the aforesaid elements to unite it to the other, means for supporting said member, operative connections between said means and the second shaft for rocking it to effective position when the aforesaid elements have been moved into correct relation to each other, and a second cam on the driven shaft for coöperation with the clutch actuating device thereby to maintain the clutch effective until the uniting operation is completed.

18. In a machine of the character set forth, the combination of a shaft, a driving member loosely mounted thereon, a clutch for operatively connecting the driving member and the shaft, a clutch actuating device, a second shaft, transmission gearing between the aforesaid shafts, a rotary support for each of two elements that are to be united, one of said supports being movable toward and from the other thereby to present one of said elements in correct relation to the other, transmission gearing between the second shaft and the rotary supporting elements, a cam upon the second shaft, a lever pivoted upon a stationary support and having one of its ends arranged to be moved by the aforesaid cam and its opposite end operatively connected to the movable support, a connecting member adapted to be moved into contact with one of the aforesaid elements to unite it to the other, means for supporting said member, operative connections between said means and the second shaft for rocking it to effective position when the aforesaid elements have been moved into correct relation to each other, a second cam on the driven shaft for coöperation with the clutch actuating device thereby to maintain the clutch effective until the uniting operation is completed, and brake mechanism for arresting the movement of one of the aforesaid shafts when the clutch becomes ineffective.

19. In apparatus for uniting two members, one consisting of a shell and the other an element that is adapted to extend transversely of the shell and having an edge portion arranged to repose in proximity to the inner surface of the shell, the combination of means for supporting each member in correct relation to but independently of the other, and a device that is movable into operative relation to the exterior of the shell in the zone of the aforesaid element, and acting to fix the adjacent portions of the members against relative movement.

20. In apparatus for uniting two members, one consisting of a shell and the other an element that is adapted to extend transversely of the shell and having an edge portion arranged to repose in proximity to the inner surface of the shell, the combination of means for supporting said members in correct relation to but independently of each other, and a member having two substantially parallel series of projections, said member being movable into contact with the exterior of the shell in the zone of the element so that the projections thereof are caused to depress portions of the shell about the opposite sides of the periphery of the element.

21. In apparatus for uniting a shell and an element that is adapted to extend transversely of the shell and having an edge portion arranged to repose in proximity to the inner surface of the shell, the combination of a shell-supporting member having a yielding abutment wherewith one end of the shell engages, an element-carrying member that is movable into operative relation to the aforesaid shell-supporting member and having a shoulder for engagement with the opposite end of the shell, the shell-supporting member and the element-supporting member having opposed portions between which the edge portion of the element is clamped, and means for connecting the adjacent portions of the shell and element.

22. In apparatus for uniting a shell and an element that is adapted to extend transversely of the shell and having an edge portion arranged to repose in proximity to the inner surface of the shell, the combination of a shell-supporting member, and an element-carrying member that are movable into operative relation to each other, one of said members having a yielding abutment for engagement by one end of the shell and the other a shoulder wherewith the opposite end of the shell engages, and means for fixing the adjacent portions of the shell and element against relative movement.

In testimony whereof, we hereunto affix our signatures in the presence of two witnesses.

WILLIAM R. JEAVONS.
ARNOLD R. WHITTAKER.

Witnesses:
BRENNAN B. WEST,
HUGH B. McGILL.

Copies of this patent may be obtained for five cents each, by addressing the "Commissioner of Patents, Washington, D. C."